(12) United States Patent
Zawacki et al.

(10) Patent No.: US 7,846,533 B2
(45) Date of Patent: Dec. 7, 2010

(54) MOLDED THERMOPLASTIC ARTICLES

(75) Inventors: Jeffrey Russell Zawacki, Channahon, IL (US); Wilfried Mozer, Warren, MI (US); Brian Leonard Desmith, Oxford, MI (US)

(73) Assignee: Hendrickson USA, L.L.C., Itasca, IL (US)

(*) Notice: Subject to any disclaimer, the term of this patent is extended or adjusted under 35 U.S.C. 154(b) by 223 days.

(21) Appl. No.: 12/055,727

(22) Filed: Mar. 26, 2008

(65) Prior Publication Data

US 2009/0246471 A1    Oct. 1, 2009

(51) Int. Cl.
B32B 3/00 (2006.01)
B32B 3/12 (2006.01)
B32B 3/26 (2006.01)
B32B 3/28 (2006.01)
B32B 3/30 (2006.01)

(52) U.S. Cl. .................. 428/156; 428/158; 428/167; 428/71

(58) Field of Classification Search ................ 428/156, 428/158, 159, 167, 31, 304.4, 71
See application file for complete search history.

(56) References Cited

U.S. PATENT DOCUMENTS

| | | | |
|---|---|---|---|
| 3,694,529 A | 9/1972 | Josephsen et al. | |
| 3,773,873 A | 11/1973 | Spaak at al. | |
| 4,133,858 A | 1/1979 | Hayakawa et al. | |
| 4,164,523 A | 8/1979 | Hanning | |
| 4,416,604 A | 11/1983 | Bender et al. | |
| 4,446,185 A | 5/1984 | Waragai et al. | |
| 4,479,914 A | 10/1984 | Baumrucker | |
| 4,500,274 A | 2/1985 | Cyriax et al. | |
| 4,544,340 A | 10/1985 | Hehl | |
| 4,572,856 A | 2/1986 | Gembinski | |
| 4,737,540 A | 4/1988 | Yoshida et al. | |
| 4,892,770 A | 1/1990 | Labrie | |
| 5,037,687 A | 8/1991 | Kargarzadeh et al. | |
| 5,093,053 A | 3/1992 | Eckardt et al. | |
| 5,114,330 A | 5/1992 | Nielsen | |
| 5,282,733 A | 2/1994 | Noritake et al. | |
| 5,403,647 A * | 4/1995 | Kaneishi et al. ............. | 428/156 |
| 5,424,112 A | 6/1995 | Kataoka et al. | |
| 5,449,698 A | 9/1995 | Mabuchi et al. | |

(Continued)

FOREIGN PATENT DOCUMENTS

EP    0 481 306 A1    4/1992

(Continued)

OTHER PUBLICATIONS

Endex International, Inc., Endex Structural Foam Molding, General Information Guide, 22 pages, 2006.

(Continued)

*Primary Examiner*—David R Sample
*Assistant Examiner*—Catherine Simone
(74) *Attorney, Agent, or Firm*—Cook Alex Ltd.

(57) ABSTRACT

An injection molded foam article including a structure and a projection projecting from the structure. The thickness of the projection is greater than 25% to 40% of the thickness of the structure, depending on the material of the article, and the front surface of the structure opposite the projection has a Class A surface.

28 Claims, 3 Drawing Sheets

U.S. PATENT DOCUMENTS

| | | | |
|---|---|---|---|
| 5,731,013 | A | 3/1998 | vanderSanden |
| 5,900,198 | A | 5/1999 | Hori |
| 5,985,188 | A | 11/1999 | Jennings et al. |
| 6,103,154 | A | 8/2000 | Branger et al. |
| 6,196,824 | B1 | 3/2001 | Foltuz et al. |
| 6,206,674 | B1 | 3/2001 | Foltuz et al. |
| 6,328,552 | B1 | 12/2001 | Hendrickson et al. |
| 6,419,289 | B1 | 7/2002 | Batten et al. |
| 6,531,087 | B1 | 3/2003 | Hendry |
| 6,589,458 | B2 | 7/2003 | DeCost |
| 6,645,587 | B1 | 11/2003 | Guergov |
| 6,863,329 | B2 | 3/2005 | Fero |
| 6,884,380 | B2 | 4/2005 | Yamaki |
| 6,918,169 | B2 | 7/2005 | Mathew |
| 6,921,571 | B2 | 7/2005 | Funakoshi |
| 6,994,814 | B2 | 2/2006 | Moriguchi et al. |
| 7,077,987 | B2 | 7/2006 | Yamaki et al. |
| 7,204,685 | B1 | 4/2007 | Crain et al. |
| 7,294,295 | B2 | 11/2007 | Sakamoto et al. |
| 2001/0021457 | A1* | 9/2001 | Usui et al. .................. 428/500 |
| 2001/0041245 | A1 | 11/2001 | Funakoshi |
| 2004/0013846 | A1* | 1/2004 | Kugimiya et al. ............. 428/71 |
| 2005/0230861 | A1 | 10/2005 | Takatori et al. |

FOREIGN PATENT DOCUMENTS

| | | |
|---|---|---|
| EP | 0593308 A1 | 4/1994 |
| EP | 0 925 895 A1 | 6/1999 |
| EP | 1479502 A1 | 11/2004 |
| GB | 1169394 | 11/1969 |
| JP | 56060239 A | 5/1981 |
| JP | 7077739 B | 8/1995 |
| JP | 10146872 A * | 6/1998 |
| JP | 11179752 A | 7/1999 |
| JP | 2001/322433 A | 11/2001 |
| KR | 10-2007-0034186 A | 3/2007 |
| WO | WO 00/38899 A1 | 7/2000 |
| WO | WO 00/38900 A1 | 7/2000 |
| WO | WO0162485 A1 | 8/2001 |
| WO | WO0162486 A1 | 8/2001 |
| WO | WO02078925 A2 | 10/2002 |
| WO | WO 2009/120838 A2 | 10/2009 |
| WO | WO 2009/120850 A2 | 10/2009 |

OTHER PUBLICATIONS

Web page printed out on Jan. 21, 2008 from Caropreso Associates, vvww.caropresoassociates.com/paper2.html, Michael E. Reedy, "Chemical Foaming Agents Improve Performance and Productivity", 9 pages.

Kazmer, D., "Design with Plastics Focus: Injection Molding" 72 pages, Web printout Nov. 24, 2008 from wvvw.kazmer.uml.edu/Staff/Archive/2003/NMW_Design_with_Plastics.pdf.

Web page printed out on Jan. 18, 2008 from www.bergeninternational.com/html/Molding.htm of Bergen International:Molding Tips, "Processing Tips", 5 pages.

Sporrer, A., et al., "Tailored Structural Foams by Foam Injection-Molding with a Specialized Mold", Department of Polymer Engineering, University of Bayreuth, Germany, SPE Foams Conference, 2006, Chicago, Illinois Sep. 12-14, 2006.

Web page print out on Jan. 21, 2008 from www.bergeninternational.com/html/product2.htm, of Bergen International: Processing Tips, "Product Guide", 5 pages.

Ampacet Bulletin, "Employing Azodicarbonamide as a Nucleating Agent in Thermoplastic Foams" from www.ampacet.com/EN/global/tutorials.html?lang=EN.

Ampacet Product Information sheet, "701039-H Foam EVA MB" dated Aug. 10, 2004.

Web page print out on Feb. 14, 2008 from wvvw.iplas.com/USA, International Plastic Laboratories and Services, "Determining Clamp Requirements", 3 pages.

Sales Presentation Sheet, "Mucell Brings Two Key Strategic Benefits to our Key Targeted Markets", from www.trexcel.com/imsales_salesrepresentation, 2007, 44 pages.

Ranade, et al., "Structure-Property Relationships in Coextruded Foam/Film Microlayers", Journal of Cellular Plastics, vol. 40, Nov. 2004, pp. 497-505.

Web page printed out from www.CaropresoAssociates.com, Caropreso, "Molding with Counterpressure; A Cost Savings Option to Increase Productivity", 9 pages.

Ampacet Product Information sheet, "701253-W Foam PE MB", dated May 3, 2004.

Ampacet Product Information sheet, "10123 Foam PE MB", dated Apr. 29, 2004.

Ampacet Product Information sheet, "701054-S Foam EVA MB", dated May 3, 2004.

Ampacet Product Information sheet, "701709-H Foam PE MB", dated Oct. 20, 2004.

PCT Notification of Transmittal of the International Search Report and the Written Opinion of the International Searching Authority, or the Declaration, PCT/US2009/038358 dated Mar. 26, 2009.

PCT Notification of Transmittal of the International Search Report and the Written Opinion of the International Searching Authority, or the Declaration, PCT/US2009/038374 PCT/US2009/038374 dated Mar. 26, 2009.

International Search Report and Written Opinion of the ISA for International Application No. PCT/US2009/038333—International Filing Date Mar. 26, 2009.

* cited by examiner

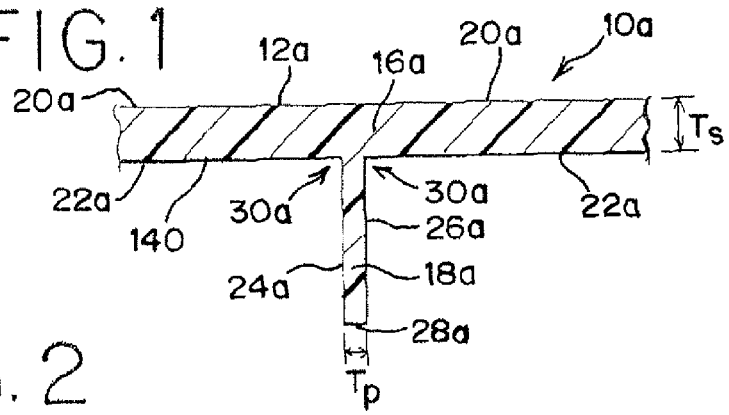
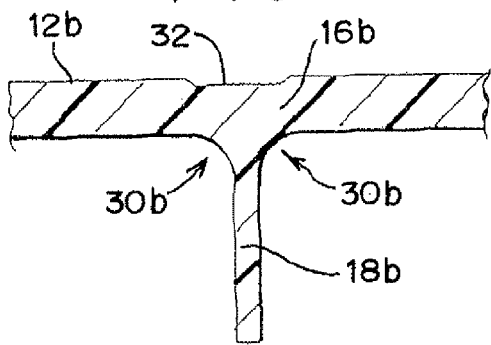
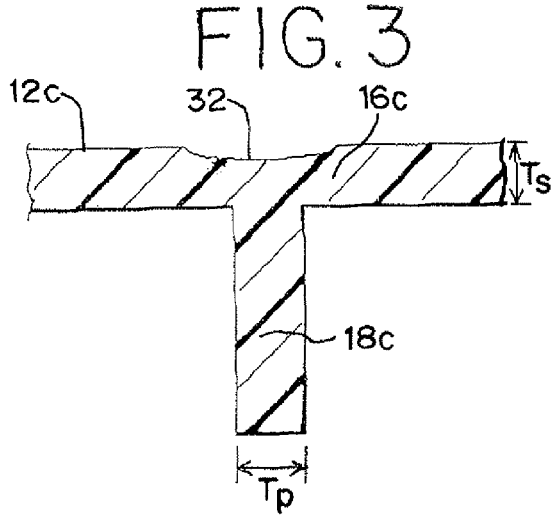
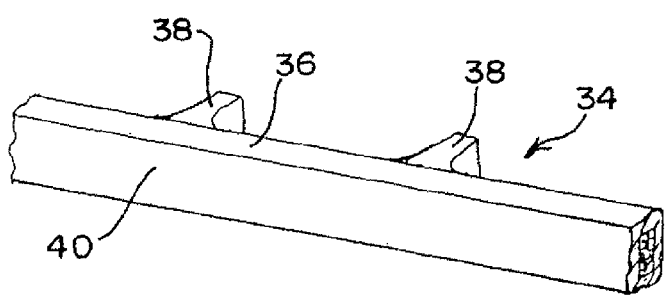
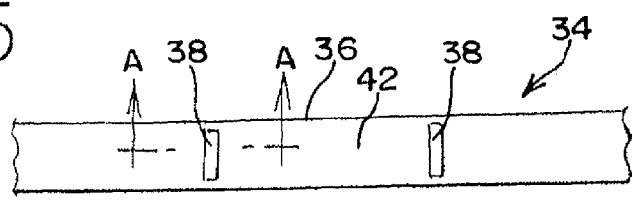

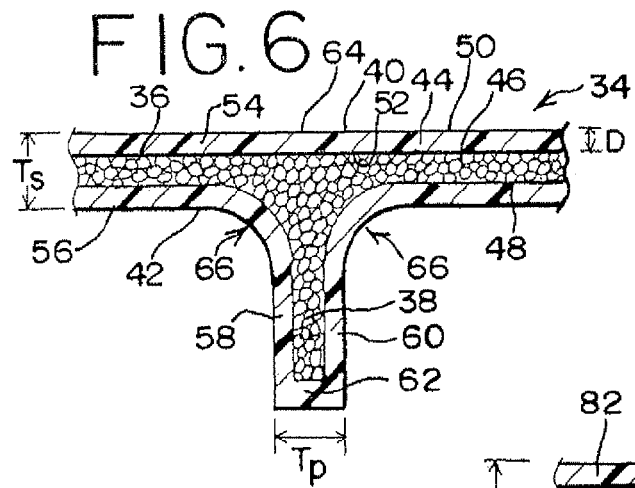
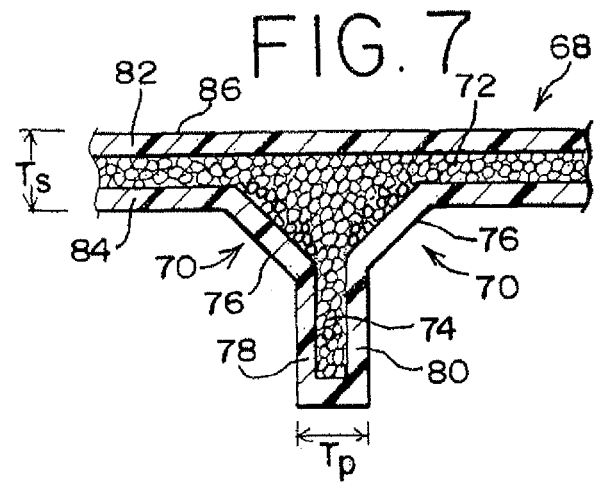
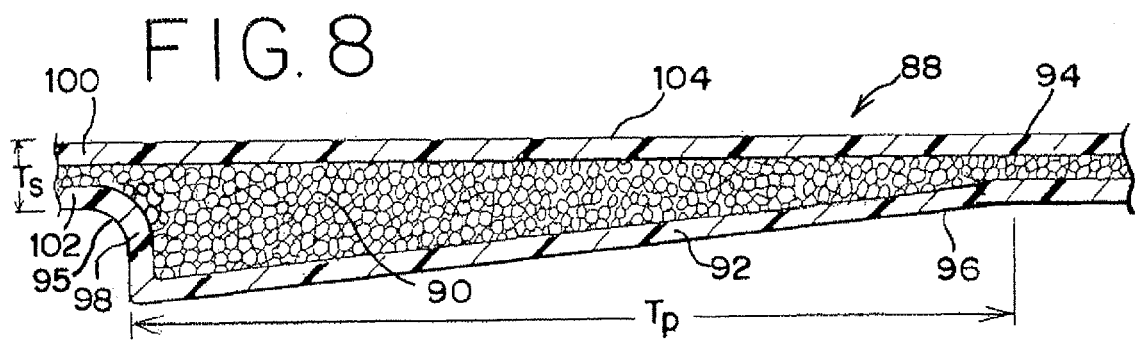
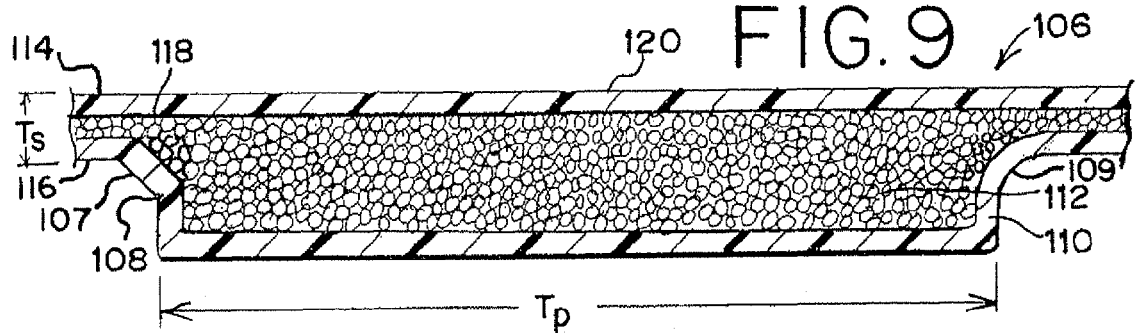

MOLDED THERMOPLASTIC ARTICLES

BACKGROUND OF THE INVENTION

The present invention relates to molded thermoplastic articles, and more specifically, to injection-molded thermoplastic foam articles.

Conventional injection molding typically involves injecting a molten thermoplastic at a high pressure into the cavity of a closed mold. The injection pressure can range anywhere from between 2,000 psi to 10,000 psi, depending on the article being made. After the thermoplastic has sufficiently cooled to a hardened condition, the mold is opened and the molded article is removed.

In conventional molding processes, a problem that is often encountered is the formation of "sink marks" or distortions on the surface of the molded article opposite a projection, such as a rib, boss, bracket or return. A sink mark is a visually perceptible divot or indentation in the surface of the article that is largely created as a result of uneven material shrinkage during the curing segment of the injection molding process.

The formation of sink marks can be caused by a variety of factors, such as, use of insufficient injection and pack out pressures during the molding process. One of the largest contributing factors to the formation of sink marks on the surface of molded articles is the ratio of the thickness of the projection to the thickness of the structure or wall stock from which the projection extends. It is well known that when conventional injection molding is used to manufacture a molded thermoplastic article that a sink mark will form in the surface of the article when a thermoplastic olefin is used and the thickness of the projection is greater than about 25% of the thickness of the structure. Furthermore, when other certain thermoplastic materials are used, such as for example crystalline, semi-crystalline or amorphous materials, a sink mark will form in the surface of the article when the projection is 40% or greater than the thickness of the structure. While a projection having a thickness greater than 25% of the thickness of the structure is not always required, there are many instances when a projection greater than the above ratio is highly desirable and beneficial. For example, a larger projection can provide greater structural integrity to the article and can provide a larger attachment area for attaching the molded article to other objects.

FIGS. 1-3 illustrate three different examples of conventional injection molding configurations. Referring to FIG. 1, the molded article 10a includes a front surface 12a and a rear surface 14a. Front surface 12a is a Class "A" surface. As used herein a Class "A" surface is intended to refer to a surface that is visually decorative and smooth to the unaided eye or, in other words, is visually free of unintentional distortions, such as "sink marks," dimples, indents, divots or the like. Such Class "A" surfaces include non-textured and purposely textured surfaces, such as haircelled surfaces and the like, that are visually free of unintentional distortions.

Molded article 10a also includes a structure or wall stock 16a and a projection 18a. The structure 16a includes a front wall 20a which is defined by a portion of front surface 12a and a rear wall 22a defined by a portion of rear surface 14a. Projection 18a includes a first sidewall 24a and a second sidewall 26a, both of which are defined by portions of rear surface 14a. Projection 18a also includes an end wall 28a defined by a portion of rear surface 14a. Furthermore, the molded article 10a also includes a joint 30a between the structure 16a and projection 18a. The joint 30a also is defined by portions of rear surface 14a and is blended with sidewalls 24a and 26a of projection 18a and rear wall 22a of structure 16a.

Sidewall 24a and sidewall 26a of projection 18a are separated by distance $T_p$, which defines the thickness of projection 18a. Additionally, front wall 20a of structure 16a and rear wall 22a of structure 16a are separated by distance $T_s$, which defines the thickness of structure 16a. It is well known in the art that to provide a Class "A" surface using thermoplastic olefins (TPO), the distance $T_p$ must be 25% or less than the distance $T_s$ and the joint 30 must be at about a 90 degrees angle. If using certain other thermoplastic materials, such as those mentioned above, the distance $T_p$ must be 40% or less than the distance $T_s$.

Comparing FIGS. 2 and 3 to FIG. 1, it is also generally well known in the standard injection molding art that when joint 30b between structure 16a and projection 18b is curved (as shown in FIG. 2) or the thickness $T_p$ of projection 18c is greater than 25% to 40% (depending on the material) of the thickness $T_s$ of structure 16c (as shown if FIG. 3), a visible distortion, such as sink mark 32, will form in front surfaces 12b (FIG. 2) and 12c (FIG. 3) of the structure during the injection molding process. It is believed that distortions occur because the relatively large mass of thermoplastic material located in the area of the wall joint, as compared to the rest of the structure, cools at a relatively slower rate as compared to the thinner portions of the structure. As the greater concentration of heat in the larger mass continues to cool to ambient, material shrinkage continues longer in the larger mass sections than in the surrounding thinner sections. The resulting delay in arriving at the ambient temperature allows the front surface to be drawn longer and further inward thereby causing a surface distortion, such as a sink mark.

While surfaces with unintentional distortions may be tolerated for non-visible, lower end products, when the products are required to have a high quality appearance, such as a Class "A" surface in exterior and interior automobile parts, unintentional distortions are highly undesirable and often make the molded article unsuitable for use. It is desirable to have Class "A" surfaces on auto parts, such as bumpers, sun-visors, cab extenders, side fairings, hoods or fenders.

Therefore, there remains a need for molded articles having relatively large projections and a Class "A" surface on the opposite side thereof, which surface is visibly free of sink marks or distortions.

BRIEF SUMMARY OF THE INVENTION

The present invention is directed to a molded article that includes a wall stock or structure that has a Class "A" front surface and a projection that extends from the rear surface of the structure. The projection has a thickness that is greater than 25% to 40% of thickness of the structure (depending on the material of the article), and the front surface of the structure opposite the projection is a Class "A" surface.

One aspect of the present invention relates to an injection-molded thermoplastic article that has a front surface, a back surface and a first distance between the front and back surfaces. The article also includes at least one projection extending from the back surface of the structure. The projection has a first sidewall and a second sidewall that is separated by a second distance that is greater than 40% of the first distance. The front surface opposite the projection is a Class "A" surface. Additionally, a blended joint is located between the structure and the projection.

Another aspect of the present invention relates to an injection-molded thermoplastic article including a structure having a front surface and a back surface separated by a first distance. The article also includes at least one projection extending from the back surface of the structure by a blended joint between the projection and the structure. The projection has a first sidewall and a second sidewall that is separated by a second distance, which is greater than 40% of the first distance, and a portion of the front surface that is opposite the projection is a Class "A" surface. Furthermore, the article includes an exterior solid skin layer and an interior foam core.

In a further aspect, the present invention is directed to a to a molded article comprised to TPO that includes a wall stock or structure that has a Class "A" front surface and a projection that extends from the rear surface of the structure. The projection has a thickness that is greater than 25% of thickness of the structure, and the front surface of the structure opposite the projection is a Class "A" surface.

BRIEF DESCRIPTION OF THE SEVERAL VIEWS OF THE DRAWING

Throughout this description, reference will be made and has been made to the accompanying views of the drawing wherein like invention has like reference numerals, and wherein:

FIG. 1 is a cross-sectional view of a prior art molded article manufactured by conventional injection molding techniques;

FIG. 2 is a cross-sectional view of another prior art molded article manufactured by conventional injection molding techniques;

FIG. 3 is a cross-sectional view of yet another prior art molded article manufactured by conventional injection molding techniques;

FIG. 4 is a front perspective view of a molded article constructed in accordance with the principles of the present invention;

FIG. 5 is a rear plan view of the molded article of FIG. 4;

FIG. 6 is a cross-sectional view of a first embodiment of a molded article constructed in accordance with the principles of the present invention as taken along lines A-A of FIG. 5;

FIG. 7 is a cross-sectional view of another embodiment of a molded article constructed in accordance with the principles of the present invention as taken along lines A-A of FIG. 5;

FIG. 8 is a cross-sectional view of yet another embodiment of a molded article constructed in accordance with the principles of the present invention as taken along lines A-A of FIG. 5;

FIG. 9 is a cross-sectional view of a further embodiment of a molded article constructed in accordance with the principles of the present invention as taken along lines A-A of FIG. 5;

DETAILED DESCRIPTION OF THE INVENTION

Figure 10:
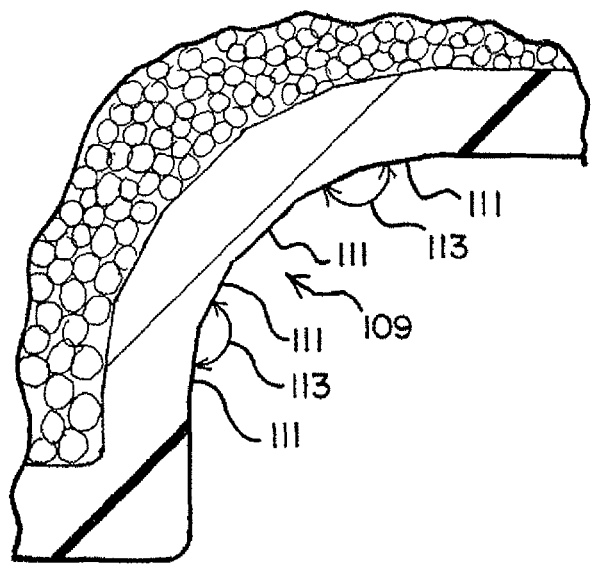
FIG. 10 is an enlarged view of one of the blended joints portions of FIG. 9.

FIGS. 4 and 5 illustrate a thermoplastic molded article or part 34. Molded article 34 is intended to be an exemplary molded article constructed in accordance with the present invention and can be used in or on virtually any product. In one embodiment, molded article 34 is an interior or exterior automotive part, such as, for example, bumpers, sunvisors, cab extenders, side fairings, hoods or fenders. Molded article 34 includes a structure or wall stock 36 and at least one integral projection 38, such as a rib, boss, bracket or return, projecting from the structure. Molded article 34 also includes a front surface 40 and a rear surface 42. Front surface 40 is a Class "A" surface. As mentioned above, as used herein a Class "A" surface is intended to refer to a surface that is visually decorative and smooth to the unaided eye or, in other words, is visually free of unintentional distortions, such as "sink marks," dimples, indents, divots or the like. Such Class "A" surfaces include non-textured and purposely textured surfaces, such as haircelled surfaces and the like, that are visually free of unintentional distortions.

Referring to FIG. 6, thermoplastic molded article 34 also includes an interior foam layer or inner core 46 and an exterior skin layer 44, which preferably, but does not necessarily, completely surround foam layer 46. Foam layer 46 can be a layer of thermoplastic material that can be foamed by the use of a chemical foaming agent or by mechanically injecting a gas into the molten thermoplastic resin as it is being heated and extruded prior to being injected into the mold cavity. As shown, the foam layer 46 has small cells 48, which are formed by the foaming agent during the molding process. The average cell diameter range may be selected independently from 0.035 mm, 0.050 mm, 0.075 mm, and 0.1 mm to 0.3 mm, 0.4 mm, 0.5 mm, 0.7 mm, and 1 mm. The density of foam layer 46 is between about 75% and about 95% of the density of the solid base thermoplastic material from which the foam layer is made.

As discussed above, exterior skin layer 44 preferably surrounds foam layer 46 and is comprised of a substantially solid layer of thermoplastic material, having few or no cells therein. The skin layer 44 has an outer surface 50 that is defined by front surface 40 and an inner surface 52. Outer surface 50 and inner surface 52 are separated by a distance D, which defines a thickness of skin layer 44. Distance D is greater than about 1.1 and can be between about 1.1 and 2.5 or greater than 2.5. Additionally, molded article 34 is comprised of about 85% by weight or greater of solid thermoplastic material and about 15% by weight or less of foamed thermoplastic material. In one embodiment, the solid thermoplastic material is about 90% by weight and the foamed thermoplastic material is about 10% by weight. Additionally, the overall composite density of article 34, which is defined by skin layer 44 and foam layer 46, is between about 93% and about 97% of the density of the solid thermoplastic material from which the article is made.

Structure 36 includes a front wall 54 defined by a portion of front surface 40 and a rear wall 56 defined by portions of a rear surface 42. In the illustrated embodiment, structure 36 is shown as flat. However, structure 36 may also be curved in that it could have a concave or convex shape. The outer surfaces of front wall 54 and rear wall 56 are separated by a distance $T_s$, which defines the thickness of the structure. In one embodiment, distance $T_s$ is about 6 mm or greater. In other embodiments, the distance $T_s$ can be between about 1 mm and about 12 mm or greater than about 12 mm. The distance $T_s$ can be measured at any point immediately adjacent to the projection and in the immediate surrounding area along the structure, except in the area immediately opposed to the projection.

Projection 38 extends from structure 36 and includes a first sidewall 58, a second sidewall 60 and an end wall 62, all of which are formed by portions of rear surface 42. Furthermore, the outer surfaces of first sidewall 58 and second sidewall 60 are separated by distance $T_p$, which defines a thickness of projection 38. The distance $T_p$ can be measured at any point along the root of the projection. In one embodiment where the molded article is made from TPO, the distance $T_p$ is greater than 25% of the distance $T_s$. In an alternative embodiment wherein the molded article is made from TPO or other thermoplastic materials, such as, for example, crystalline, semi-crystalline or amorphous materials, the distance $T_p$ can be greater than 40% of the distance $T_s$. In yet further embodiments and regardless of whether the molded article is made of TPO or some other suitable polymer material, the distance $T_p$ is about 50% or greater than the distance $T_s$, about 75% or greater than the distance $T_p$, or about 100% or greater than the distance $T_s$. In yet other embodiments, the distance $T_p$ is between about 100% to about 200% of the distance $T_s$, between about 200% and about 1000% of the distance $T_s$, or about 1000% or greater than the distance $T_s$. Even though the distance $T_p$ is greater than 25% or 40% of the distance $T_s$ (depending on the polymer of the molded article), the front surface 40 of molded article 34 is a Class "A" surface. In particular, the portion 64 of the front surface 40 opposite projection 38 is a Class "A" surface that is visually free of the distortions that are due to the uneven material shrinkage which results from the uneven cooling of the thermoplastic material mass.

In one embodiment, the distance $T_s$ is about 6 mm or greater and the distance $T_p$ is greater than 25% or 40% of the distance $T_s$. In yet another embodiment, the distance $T_s$ is about 10 mm or greater and the distance $T_p$ is greater than 25% of the distance $T_s$ or greater than 40% of the distance $T_s$.

In FIG. 6, the rear wall 56 of structure 36 blends with first sidewall 58 and second sidewall 60 to define a blended joint 66 between projection 38 and structure 36. In the embodiment shown, joint 66 is a curved joint. As used herein, the term "blended joint" is intended to mean a joint other than one at a 90 degree angle. Such blended joints can include, for example, curved joints, joints including fillets, joints at angles larger than 90 degrees, chamfers and joints including multiple angled portions or flats. Blended joints provide several benefits. For example, molded articles having blended joints have a more uniform distance $T_s$ between the exterior surface 50 and interior surface 52 of the skin layer 44, i.e., a uniform thickness of skin layer 44, especially, in the area of the joint. The uniform skin layer reduces the risk of forming sink marks and other distortions during the manufacturing process.

Thermoplastic materials that can be used to make articles in accordance with the present invention can include, for example, all crystalline, semi-crystalline and amorphous thermoplastics In one embodiment, the thermoplastic material used is a thermoplastic polyolefin (TPO), such as Solvay Sequel #1980 or Sequel #1715, commercially available through Solvay Engineered Polymers. Additionally, the thermoplastic material can contain additives, such as fire retardants, elastomers, talc fillers, pigments and fiber reinforcements.

FIG. 7 illustrates another embodiment of an article 68. In this embodiment, blended joint 70 between structure 72 and projection 74 includes chamfers 76. The ratio of the distance $T_p$ between the first and second sidewalls 78 and 80 of projection 74 to the distance $T_s$ between the front and rear walls 82 and 84 of structure 72 is any of the ratios described above and the front surface 86 of molded article 68 is a Class "A" surface.

FIG. 8 illustrates yet another embodiment of a molded article 88. Molded article 88 includes a non-uniform projection 90 in which the second sidewall 92 extends at an angle from structure 94. Article 88 includes a first blended joint portion 95 and a second blended joint portion 96. First joint portion 95 is a radiused joint, similar to the radiused joint shown in FIG. 6. Second blended joint portion 96 includes an angled joint that has an angle that is larger than 90 degrees, and more particularly, about 170 degrees. The ratio of the distance $T_p$ between the first and second sidewalls 98 and 92 of projection 90 to the distance $T_s$ between the front and rear walls 100 and 102 of structure 94 is any of the ratios described above and the front surface 104 of molder article 88 is a Class "A" surface.

FIG. 9 illustrates a further embodiment of molded article 106 having a Class "A" surface even though the distance $T_p$ between the first sidewall 108 and the second sidewall 110 of projection 112 is on the order of about 10 times (1000%) larger than the distance $T_s$ between the front and rear walls 114 and 116 of structure 118. Additionally, article 106 includes a first blended joint portion 107 and a seconded blended joint portion 109 between structure 118 and projection 112. First and second blended joint portions 107 and 109 can be any of the various types of blended joints described herein. In the embodiment shown, first joint portion 107 includes a chamfer generally similar the one described above with respect to FIG. 7. Referring to FIG. 10, second joint portion 109 includes a plurality of flats, or generally straight surfaces 111 that are connected at angles 113 larger than 90 degrees.

Figure 11:
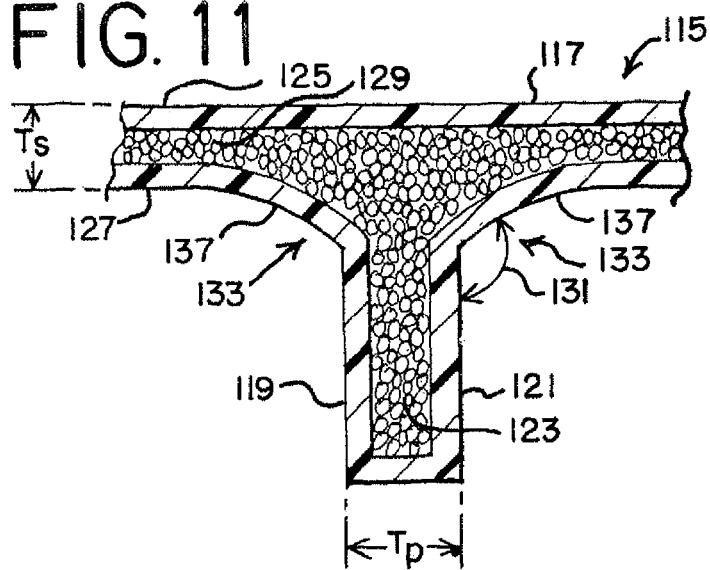
FIG. 11 is a cross-sectional view of yet another embodiment of a molded article constructed in accordance with the principles of the present invention as taken along lines A-A of FIG. 5.

FIG. 11 illustrates yet another embodiment of a molded article 115 having a Class "A" front surface 117. Similar to the previous embodiments, the ratio of the distance $T_p$ between the first sidewall 119 and the second sidewall 121 of projection 123 relative of the distance $T_s$ between the front surface 125 and rear surface 127 of structure 129 can be any of the above described ratios. Additionally, article 115 includes a blended joint 133. In this embodiment, in an area adjacent joint 133, rear surface 127 of structure 129 has curved, relatively large radiused portions 137. The curved portions 137 of the rear surface 127 intersects first and second sidewalls 119 and 121 of projection 123, respectively, at an angle 131 that is greater than 90 degrees, and preferably about 135 degrees, to form blended joint 133.

As previously mentioned, several different factors of the molding process have an effect on whether sink marks are formed in the front surface of the structure. Without being held to any particular theory, it is believed that the skin layer/foam layer construction and blended joint configurations disclosed herein significantly reduce the formation of sink marks and other distortions in the front surface of the structure, especially when the molded article includes a projection with a thickness that is greater than 25% or 40% of the thickness of the structure, depending on the material of the molded article.

The molded foam articles in accordance with the present disclosure can be manufactured using the following gas-counter pressure foam injection-molding process. Gas counter pressure can be used with an injection mold that has a specially sealed cavity to contain the injected counter pressure gas, which is mounted in a standard injection molding machines that typically include a resin hopper, a melt injection unit, a clamping unit and a source of counter pressure gas.

In one embodiment of the process, a standard injection molding machine is fitted with a mold, whose cavity has been specially sealed and has been prepared for gas injection and venting. For example, compressible seals are applied to the mold at the parting line and any other slides, cores, lifters, ejector pins that penetrate the mold block, as needed, to prevent leakage of gas from a sealed mold cavity having a pressure in excess of atmospheric pressure. The sealed mold cavity receives a pressurizing gas to increase the pressure inside the mold cavity above atmospheric pressure.

Figure 12:
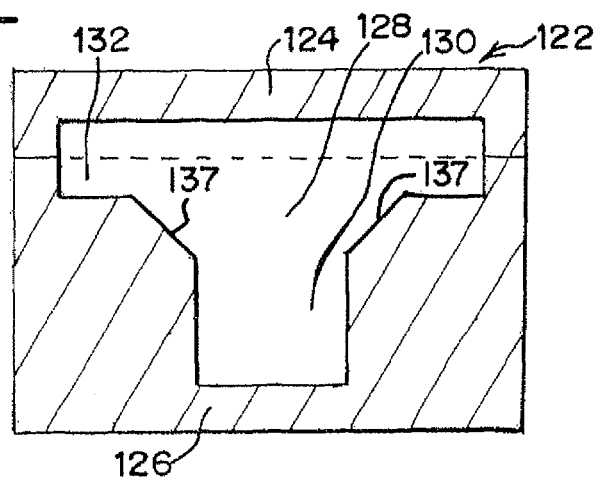
FIG. 12 is a cross-sectional view of a mold that can be used in the process of the present invention

FIG. 12 illustrates one embodiment of a mold 122 that has a top portion 124 and a bottom portion 126 which separate to open and close. When closed, top portion 124 and bottom portion 126 form a cavity 128. The cavity 128 includes a projection sub-cavity 130 and a structure sub-cavity 132. The project sub-cavity 130 and the structure sub-cavity 132 are such that they form a shape configured to mold an article having a structure and a projection projecting from the structure. In particular, the shape of the cavity is configured so that ratio of the thickness of the projection to that of the structure is within the ranges described above, and in any event the thickness of the projection is greater than 25% or greater than 40% of the thickness of the structure. The cavity 130 also includes a blended joint portion 137 which configured to mold an article having any of the blended joints described herein.

Foaming of the thermoplastic resin can be accomplished either mechanical gas injection or with the addition of a chemical foaming agent to the molding resin. In the mechanical method, the foaming gas, such as nitrogen or another suitable gas, is directly introduced into the melt stream between the extruder barrel of the injection unit and the mold cavity so that the gas is dissolved into and contained by the pressurized melt. Upon the injection of a shot, the gas is allowed to expand in the mold cavity to make a foamed part structure. When a chemical foaming agent (CFA) is used, the chemical pellets are blended together with the thermoplastic material pellets and the mixture is then introduced into the machine through the hopper. The chemical foaming agent is reacted by the heat of the extruder, thereby generating gasses within the molten thermoplastic material to create a thermoplastic/gas mixture. The chemical foaming agents can be any suitable chemical foaming agents, such as, for example, TRCEN40310ES, which is commercially available from TechmerPM, Cell-Span #1000, which is commercially available from Phoenix Plastics, and Ampacet#701039-H, which is commercially available from Ampacet. In one embodiment, the amount of foaming agent added to the thermoplastic material is about 0.5% to 2% by weight, and in another embodiment, the foaming agent is about 1% by weight or greater.

In one embodiment, the foaming or blowing agent is added to the plastic material before the plastic material is melted in order to generate a plastic matrix having a number of voids. In alternative embodiments, the foaming agent may be added during or even after melting of the plastic matrix. Foaming agents may include a chemical blowing agent such as an endothermic solid, an exothermic solid, and a binary solid; and/or a physical blowing agent, such as a liquid that is infused or dissolved in the plastic matrix, a core-shell combination of a blowing agent inside of a plastic shell, and/or a gas injected or dissolved under pressure into the melted plastic.

A non-limiting example of the exothermic blowing agent is an exothermic foam concentrate. A foam concentrate may include a heterogeneous nucleating agent. An example of the heterogeneous nucleating agent is an azo-type nucleating agent, such as modified azodicarbonamide (ADC), which is sold as a chemical blowing agent such as the above mentioned Ampacet #701039-H. ADC benefits from releasing nitrogen gas versus carbon dioxide. Nitrogen gas has a relatively low molecular weight, making it more reactive. Nitrogen's better foaming properties means that masterbatch of plastic and ADC uses only 20 wt %. ADC versus the more typical 50 wt % for carbon dioxide generating chemical blowing agents. Chemical blowing agents and exothermic foam concentrates may also be used in conjunction with physical blowing agents. Other examples of nucleating agents include particulate solids such as talc or silica.

Nucleating agents generally lead to relative finer cell structure than when no nucleating agent is used. Finer cell structure may result in a 1-15 absolute percent reduction in density of the plastic matrix relative to the density that may be achieved using talc. ADC, when finely dispersed in the melted plastic, may produce a very fine cell structure including a micro-cellular structure. An absolute weight reduction of 39% or less may be obtained using the azo-type nucleating agent. Typically, the average cell diameter, when using ADC as the nucleating agent, may range from about 0.1 mm to about 0.5 mm. The cell diameter may be reduced further by suppression of the cell growth by the counter-pressure. The cell size range may be selected independently from 0.035 mm, 0.050 mm, 0.075 mm, and 0.1 mm to 0.3 mm, 0.4 mm, 0.5 mm, 0.7 mm, and 1 mm.

When using a nucleating agent such as ADC, it is important to carefully control the temperature of the machine used to blend melted plastic with the nucleating agent and the temperature of the mold. It is desirable that the nucleating agent is activated immediately before foaming is desired. Premature activation may result in the loss of effectiveness of the nucleating agent. A gas generation range may be selected independently from 165, 170, 180, or 200° C. to 215, 200, 182, or 175° C. The maximum processing temperature may range from 230° C. to 260° C. or as high as 10° C. below the degradation temperature of the plastic. The foaming agent concentrate or any other chemical blowing agent may be diluted in the plastic matrix (a letdown ratio) in a range independently selected from 0.1, 1, 2, 5 wt % to 10, 20, 30 wt %. The plastic into which the foaming agent concentrate or any other chemical blowing agent is blended may be in the injection molding grade range. As an example of injection molding grade properties, a melt index before addition of additives and blowing agents may range from 5 to 100 gm/10 min when measured by the method ASTM D1238 condition L.

After or as the thermoplastic material is transformed into a molten state and gasses are dissolved therein, the mold is closed and pre-pressurized with a counterpressure gas, such as nitrogen or dried ambient air. The mold is pre-pressurized to a range that is independently determined and selected from 50, 80, 90 psi (625, 1000, 1125 Pa) to 120, 150, and 200 psi (1500, 1875, and 2500 Pa) to suit the application. In one embodiment, the mold is pressurized to about 150 psi. As explained in more detail below, the counter pressure gas will provide a pressure to the molten thermoplastic/gas mixture, which is greater than the vapor pressure of the foaming gas, to prevent the gas within the thermoplastic from effervescing or foaming the thermoplastic as the mixture is injected into the mold cavity.

After the mold has been pressurized, the molten thermoplastic/gas mixture is injected or shot through a gate and into the mold cavity. The injection pressure at which the thermoplastic/gas mixture is shot into the cavity largely depends on the size and shape of the cavity, and can range from about 300 psi to about 2000 psi. As the thermoplastic/gas mixture enters the cavity, the natural tendency is for the gas within the mixture to effervesce, i.e., form gas bubbles that foam the thermoplastic. However, the gas counter pressure within the mold suppresses the effervescing of the gas, allowing a substantially solid exterior skin layer to form around the exterior of the thermoplastic/gas mixture. The substantially solid skin layer does not contain or has a very small amount of cells.

As or after the thermoplastic/gas mixture has been injected, the pre-pressurized counter pressure gas is vented from the mold. The venting can occur as the thermoplastic/gas mixture is injected or the venting can be delayed until after the mixture has been injected. In one embodiment, the venting of the counter pressure gas is delayed for a period lasting more than about 1.5 seconds, 5 seconds, 7 seconds or between about 1 second to about 10 seconds after the shot has been completely delivered into the mold. In another embodiment, the venting delay is about 3 seconds to about 8 seconds. The venting delay is directly proportional to the thickness of the skin layer, i.e., the longer the venting delay, the thicker the skin layer. Once the desired skin thickness has been achieved, the releasing or withdrawing of the gas from the pressurized mold during a depressurization period may be either a controlled process, such as through a pressure relief valve, or an uncontrolled process, such as through an atmospheric vent or into a recovery vessel. After the counter pressure gas has been vented and the solid skin layer is formed, the gas effervesces to form cells within the thermoplastic material, creating the foam layer or inner core under the skin layer.

In addition to venting the counter pressure gas, after the thermoplastic gas mixture has been injected, the pack out or boost pressure is purposely kept at zero or at a very low pressure. In one embodiment the pack out pressure is between about 1 psi and about 75 psi. Even though the pack out pressure is zero or very low, the thermoplastic/gas mixture continues to fill or pack out the cavity because the outward pressure applied by the effervescing gas within the thermoplastic/gas mixture causes the mixture to grow or enlarge, to fill or pack out the mold cavity.

After the thermoplastic material has sufficiently cooled to a hardened state, the mold is opened and the molded article is removed. The range of hold times can be independently selected from 1 second, 5 seconds, 10 seconds, 16 seconds, and 20 seconds to 20 seconds, 30 seconds, 40 seconds, or 50 seconds, depending on a desired skin and foam core structure distribution. After a hold time in which the article completely solidifies, the mold may then be opened and the molded foam core article can be removed. The foamed body has a skin layer and a foamed core layer. The foamed core layer thickness range may be selected from greater than 1 mm, 2 mm, and 3 mm to less than 50 mm, 40 mm, 30 mm, 20 mm, 10 mm, and 5 mm as dictated by part design. The skin layer is sufficiently thick to prevent cells of the foamed core layer from being visible or evident in the skin layer. The weight reduction range may be independently selected from greater than 1, 2, and 3 wt % to 5, 7, 10, 20, and 30 wt % to suit the needs of the molded article.

The following Examples provide different embodiments of foam injection molding methods that can be employed to manufacture the molded thermoplastic articles of the present invention. It should be understood that various other methods can also be used to manufacture such molded thermoplastic articles and that the molded thermoplastic articles of the present invention are not meant to be limited by the following Examples.

Example 1

A TPO resin, SOLVAY SEQUEL production number 1980HI, is used as a plastic resin matrix. This resin is based on SEQUEL number 1715, an engineered polyolefin, having a low coefficient of linear thermal expansion. Polyolefin is mixed with 1 wt. % of the exothermic chemical forming agent supplied by AMPACET number 701039-H, which comprises about 20% of a modified ADC.

Example 2

PHOENIX PLASTICS provides a masterbatch formulation using a polyolefin. CELL-SPAN 1000 uses a polyolefin polymer formulated with supramolecular chemistries which allow formulation of directional hydrogen bonds that emulate the stronger covalent bonds. The foaming agent used in the CELL-SPAN product line includes the function of the nucleating agent. The letdown ratio is 1%, but could be as little as 0.2% by weight. CELL-SPAN 1000 is an endothermic chemical foaming agent. It is intended to yield a small cellular structure instead of a fine cell diameter structure.

Example 3

TPO resin SOLVAY SEQUEL production number 1980HI blends with 1% of TECHMER TECHSPERSE type TRCEN40310ES to form a masterbatch.

Example 4

TPO resin from SOLVAY SEQUEL production number 1980HI, which is derived from SEQUEL number 1715, comprises the control material.

Example 5

Articles in this example, six inch by eight inch (48 in$^2$, 310 cm$^2$) plaques, are molded from materials used in Example 1, 2, 3, and 4 with conditions and results provided in Table 1.

TABLE 1

| | TPO RESIN: Solvay Sequel #1980 HI (Sequel #1715 | TECHMER TRCEN40310ES | PHOENIX PLASTICS CELL-SPAN #1000 | AMPACET #701039-H |
|---|---|---|---|---|
| Press Type & Size | 300 ton Van Dorn | 300 ton Van Dorn | 300 ton Van Dorn | 300 ton Van Dorn |
| Clamp Force: | 300 tons | 75 tons | 75 tons | 75 tons |
| Mold Temperature: | 130 F. | 110 F. | 145 F. cavity/135 core | 125 F. |
| Melt Temperature by Zone: | 400/410/420/400 F. | 400/410/410/410 F. | 400/410/420/410 F. | 400/410/420/410 F. |
| Shot Size: | 6.2 in. | 5.6 in. | 5.4 in. | 6.0 in. |
| Shot Speed: | Fast | 4.1 | 1.34 | 10.59 |
| Cycle Time: | 90 sec. | 80 sec. | 80 sec. | 120 sec. |
| Gas Cntr. Press. | N/A | 90 psi | 50 psi | 150 psi |
| Gas Release Delay | N/A | 3 sec. | 3 sec. | 3 sec. |
| Boost Pressure: | 2000/75 | 2000/177 | 2000/322 | 2000/180 |

TABLE 1-continued

| | TPO RESIN: Solvay Sequel #1980 HI (Sequel #1715 | TECHMER TRCEN40310ES | PHOENIX PLASTICS CELL-SPAN #1000 | AMPACET #701039-H |
|---|---|---|---|---|
| Hold Pressure: | 400 psi | 25 psi | 5 psi | 50 psi |
| Hold Time: | 15 sec | 20 sec | 5 sec | 30 sec |
| Back Pressure: | 80 psi | 80 psi | 100 psi | 100 psi |
| Cure Time: | 60 sec | 50 sec | 50 sec | 55 sec |
| Screw RPM: | 150 | 150 | 175 | 175 |
| Melt Control: | good | good | good | drool |
| Part Issues: | none | none | none | post blow tendency |
| Part Weight: | | | | |
| 5.0 mm | 0.360 lb. | 0.335 lb. | 0.355 lb. | 0.356 lb. |
| % Change | 0 | −7.00% | −1.14% | −1.12% |
| 7.0 mm | 0.477 lb. | 0.447 lb. | 0.465 lb. | 0466 lb. |
| % Change | 0 | −6.30% | −2.50% | −2.30% |

With the use of chemical foaming agent, the clamp force is reduced from 300 tons force (2670 kN) to 75 tons force (667 kN) or up to about 75%. The shot size is reduced in a range of 3 wt % to 13 wt % when a foaming agent was added to the TPO relative to the original TPO control. However, the shot time increases up to 10.59 seconds and ranged from 1.34 to 10.59 seconds. As a consequence, the cycle time also increases by 30 seconds or up to 33%. The gas counterpressure ranges from 50 to 150 psi (349-1034 kPa). It should be understood that additional combinations of shot size, shot speed, and gas counter-pressure could be used depending upon the resulting product and its specifications.

In this set of examples, the counterpressure gas is withdrawn over a period of about 3 seconds. The hold time which contributes to the cycle time increased as much as 15 seconds or 100% using the chemical foaming agents. The material from Example 1 tends to exhibit a tendency to foam beyond the hold time. The plaque parts exhibit a reduction in weight of about 1% to about 7%.

With the Example 1 material, it is surprising that additional gas counterpressure is necessary to make the skin thick enough to hide the cell structure and provide a Class A surface. The increased counterpressure ranges from a 25% increase to as much as a 300% increase relative to other chemically blown TPOs. The foaming agent shows a surprising drastic difference in the chemical foaming agent reactivity when using Example 1 relative to Examples 2 and 3. The foam layer continues to foam well despite the relatively greater counterpressure. This results in the plaque sample having the relatively thick skin desired for durability and the relatively uniformly distributed foam cells of very fine cell diameter. The cells are desirably isotropic in shape, also.

Example 6

A foam expansion trial is performed using the material from Example 1. In order to determine the limit of the foams expansive capability, a 5.0 mm cavity is filled with enough resin and foam mixture to yield an acceptable plaque. The same shot volume is then injected into a 7.0 mm cavity and allowed to foam to its natural limits in the presence of gas counter-pressure of 150 psi (1034 kPa). If the resulting plaque is of acceptable quality the shot size is adjusted down to the point where the foam attains a minimal density and still yields an acceptable plaque. If the resulting plaque is not acceptable in terms of quality because it is a short shot, the shot size is adjusted up to the point where the foam attains a minimal density in yields of acceptable plaque. The degree of free-rise change is then calculated by comparing the shot deviation to the original setting. The results are shown in Table 2.

TABLE 2

Test Process:

Calculated shot size for 5.0 mm plaque = (6.0/12) 5 = 2.5 inches stroke.
Calculated shot time for 5.0 mm plaque = (10.6/12) 5 = 4.42 sec shot
Gas counterpressure and all other machine settings remain as before.

| Test Results: | Plaque Condition |
|---|---|
| 5.0 mm plaque weight of 0.356 lb. at 2.5 inches shot | Full part with smooth surface, no flash |
| 7.0 mm plaque weight of 0.361 lb. at 2.6 inches shot | Incomplete part fill w. many dimples front & back of part |
| 7.0 mm plaque weight of 0.357 lb. at 2.7 inches shot | Incomplete part fill w. many dimples front & back of part |
| 7.0 mm plaque weight of 0.387 lb. at 2.8 inches shot | Full part with 1.13 in surface splay, 69 dimples in middle |
| 7.0 mm plaque weight of 0.403 lb. at 2.9 inches shot | Full part with 0.87 in surface splay, 70 dimples in middle |
| 7.0 mm plaque weight of 0.419 lb. at 3.0 inches shot | Full part with 0.50 in surface splay, 63 dimples in middle |
| 7.0 mm plaque weight of 0.423 lb. at 3.1 inches shot | Full part with 0.038 in surface splay, 57 dimples in mid. |
| 7.0 mm plaque weight of 0.431 lb. at 3.2 inches shot | Full part with no splay, 43 dimples in middle of surface |
| 7.0 mm plaque weight of 0.471 lb. at 3.3 inches shot | Full part, smooth surface, no flash |

In order to achieve a fully foamed 5.0 mm plaque that has a good surface after gas counterpressure, the amount of cavity fill is minimized to the point where cell structure of the foam is maximized. At the point where the cell structure is maximized, the part still must have good surface appearance and part integrity. As a result of this minimizing effort, the potential for further cell expansion is reduced to the point where the introduction of that same shot size into a larger cavity does not yield any further expansion. The results include detection of quality issues associated with a short shot part.

TABLE 3

| Fillet | Material | Result |
| --- | --- | --- |
| No fillet | Example 4 | Sink marks on A-side surface. |
| No fillet | Example 1 | Fewer sink marks on A-side surface than Example 1/no fillet trial. |
| Fillet | Example 4 | Fewer sink marks on A-side surface than Example 1/no fillet trial. |
| Fillet | Example 1 | Class A surface |

Surprisingly, the combination of this method and this material, when combined with the use of fillets on the ribs and projections on the B-side of the mold surface, results in the desired Class "A" surface on a relatively large article.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. An injection-molded thermoplastic article, comprising:
   a structure having a front surface and a rear surface separated by a first distance;
   at least one projection projecting from the rear surface of the structure, said projection having a first sidewall and a second sidewall separated by a second distance, the second distance is about 200% or greater than the first distance, the first and second sidewalls of the projection defining a space therebetween, the space being continuously occupied by an inner core;
   a blended joint between the structure and the projection; and
   wherein the front surface opposite the projection is a Class A surface.

2. The article of claim 1 in which the second distance is about 1000% or greater than the first distance.

3. The article of claim 1 in which the second distance is about 10 mm or greater.

4. The article of claim 1 in which the first distance is about 5 mm or greater.

5. The article of claim 1 in which the article includes an exterior skin layer and the inner core comprises an interior foam.

6. The article of claim 5 in which the exterior skin has an exterior surface and an interior surface separated by a third distance that is about 1.5 mm or greater.

7. The article of claim 6 in which the third distance is about 2.5 mm or greater.

8. The article of claim 1 comprising about 90% by weight or greater of solid thermoplastic material.

9. The article of claim 1 in which the blended joint is curved.

10. The article of claim 1 in which the blended joint includes fillets.

11. The article of claim 1 in which the blended joint includes multiple angles.

12. The article of claim 1 wherein the article is an automotive part.

13. An injection-molded thermoplastic article, comprising:
    a structure having a front surface and a rear surface separated by a first distance;
    at least one projection projecting from the rear surface of the structure and a blended joint between the projection and the structure, the projection having a first sidewall and a second sidewall separated by a second distance, the second distance being greater than 40% of the first distance;
    the article having an exterior substantially solid skin layer and an interior foam core; and
    wherein the front surface opposite the projection is a Class A surface.

14. The article of claim 13 in which the second distance is about 50% or greater than the first distance.

15. The article of claim 13 in which the second distance is about 75% or greater than the first distance.

16. The article of claim 13 in which the second distance is about 100% or greater than the first distance.

17. The article of claim 13 in which the second distance is about 200% or greater than the first distance.

18. The article of claim 13 in which the second distance is about 1000% or greater than the first distance.

19. The article of claim 13 in which the second distance is about 4 mm or greater and greater than about 25% of the first distance.

20. The article of claim 13 in which the second distance is about 4 mm or greater and the first distance is about 6 mm or greater.

21. The article of claim 13 in which the exterior skin has an exterior surface and an interior surface separated by a third distance that is about 1.5 mm or greater.

22. The article of claim 21 in which the third distance is about 2.5 mm or greater.

23. The article of claim 13 comprising about 90% by weight or greater of solid thermoplastic material.

24. The article of claim 13 in which the blended joint is curved.

25. The article of claim 13 in which the blended joint includes fillets.

26. The article of claim 13 in which the blended joint includes multiple angles.

27. The article of claim 13 wherein the article is an automotive part.

28. An injection-molded thermoplastic article which is formed by a injection molding process that includes injecting a thermoplastic into a cavity of a mold, comprising:
    a structure having a front surface and a rear surface separated by a first distance;
    at least one projection projecting from the rear surface of the structure, said projection having a first sidewall and a second sidewall separated by a second distance, the second distance is greater than 40% of the first distance;
    a blended joint between the structure and the projection;
    the article having an exterior substantially solid skin layer and an interior foam core; and
    wherein the front surface of the structure opposite the projection is an exterior Class A surface, and the class A surface is formed as a result of pre-pressurizing the cavity of the mold with a gas counter pressure prior to injecting the thermoplastic into the cavity of the mold and venting the gas counter pressure from the mold.

* * * * *